E. F. MANCHESTER.
POOL REGISTER.
APPLICATION FILED DEC. 13, 1911.
1,030,786.
Patented June 25, 1912.
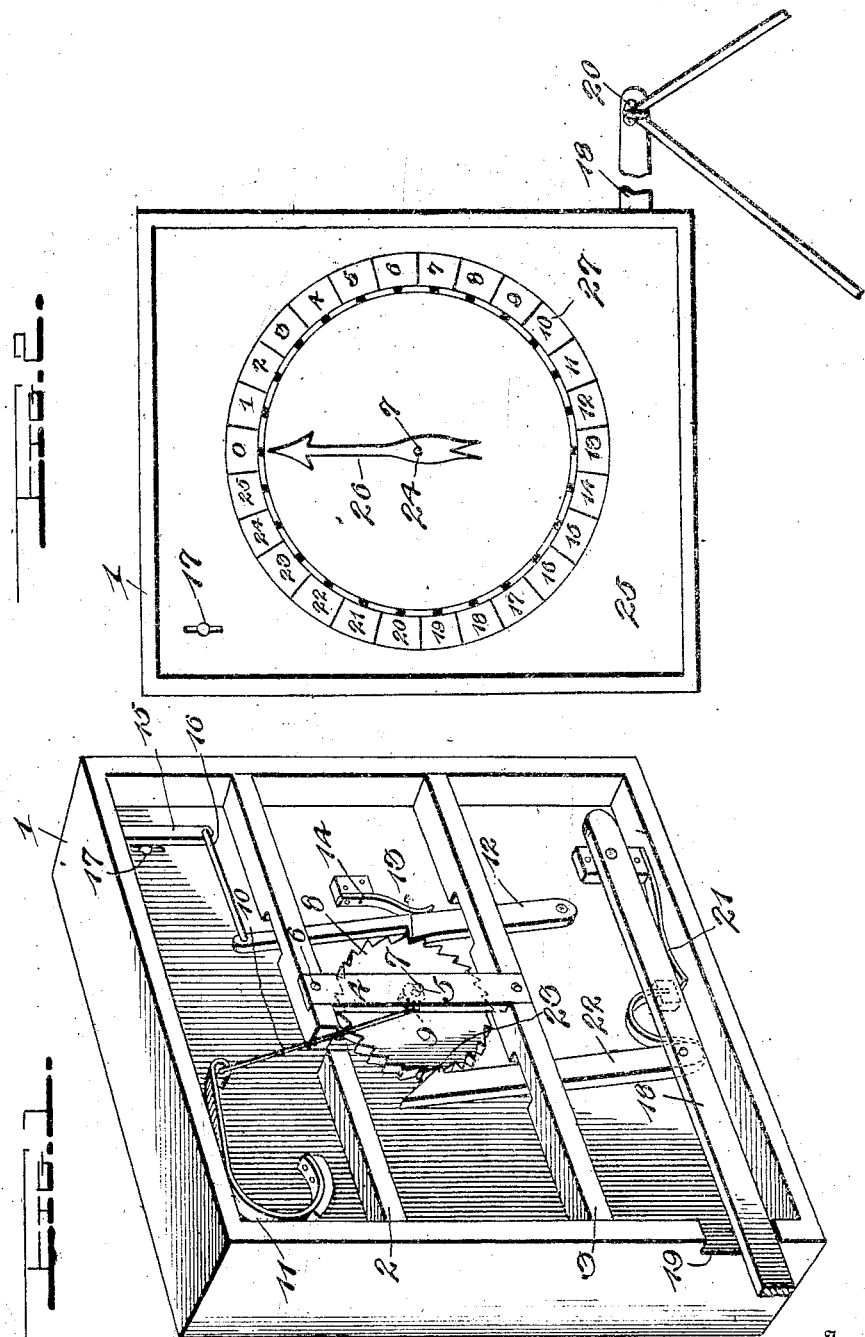
Inventor
E. F. Manchester,
Witnesses
Chas. L. Griesbauer.
G. B. Norton.
By Watson E. Coleman.
Attorney

UNITED STATES PATENT OFFICE.

ERNEST F. MANCHESTER, OF RANDOLPH, VERMONT.

POOL-REGISTER.

1,030,786.  Specification of Letters Patent.  Patented June 25, 1912.

Application filed December 13, 1911. Serial No. 665,499.

*To all whom it may concern:*

Be it known that I, ERNEST F. MANCHESTER, a citizen of the United States, residing at Randolph, in the county of Orange and State of Vermont, have invented certain new and useful Improvements in Pool-Registers, of which the following is a specification, reference being had to the accompanying drawings.

This invention relates to registers and more particularly to a register and indicator for games of pool and the like, and has for its object to provide a device of this class which can be readily and cheaply manufactured, and have its parts so arranged as to permit the easy inspection and repair of the same whenever the same is desirable.

A further object of this invention is to have the mechanism used in this device as simple as possible so that there will be little opportunity for the same to get out of order.

Other objects of this invention will become apparent as it is more fully set forth.

In the accompanying drawings which illustrate by way of example an embodiment of this invention, Figure 1 is a view in perspective of a registering device embodying this invention, and with its back removed. Fig. 2 is a detail of the cover used with this device, said cover being provided with an indicating means used for registering the points or games played.

Similar reference characters refer to similar parts throughout the drawings.

In the construction shown in the drawings, 1 represents the casing, which is arranged to receive the various working parts of the device, and is provided with a pair of cleats 2 and 3, extending across the back of the same and securely fastened thereto. A transverse cleat 4 which is provided with a hole 5 therein is fastened to the cleats 2 and 3, by any suitable means 6, and serves to support the axle 7 of the ratchet wheel 8. The wheel 8 is provided with an enlarged hub 9, which is arranged to receive a cord 10 which is held in tension by a suitable spring 11 secured to the casing.

A pawl lever 12 is pivotally secured to the casing 1, and has its tooth 13 arranged to engage in the teeth of the ratchet wheel 8, for the purpose of restraining the same from being actuated by the spring 11, and is arranged to move in slots provided in the cleats 2 and 3. This pawl lever is kept in contact with the wheel 8 by means of a flat spring 14 suitably secured to the casing, as is clearly shown in the drawings.

A lever 15 is mounted in one corner of the casing and suitably pivoted thereto, and provided with a link member 16 that secures it to the pawl lever 12. The parts 15 and 16 are for the purpose of providing means for permitting a key to be used in connection therewith, for pulling the pawl lever 12 out of registry with the wheel 8. The lever 15 is actuated by means of a key inserted in the slot 17, in the door of the casing, and is disposed so that the key will cause the lever to move on its pivot in the direction shown by the arrow, and thereby cause the tooth 13 to disengage from the teeth of the wheel and permit the same to operate under the action of the spring 11.

A lever 18 is fastened to the lower portion of the casing and extends through a hole 19 in the side thereof, and is provided with a hook 20 for the purpose of providing means for supporting a pool triangle thereon. This lever is held in its uppermost position by means of a suitable spring 21, preferably fastened to a casing 1. The lever 18 is arranged to actuate another pawl lever 22 and thereby cause its tooth 23 to pull down on the ratchet wheel 8 and thereby cause the same to be tensioned by the spring 11 as the cord 10 of the same is wound on the hub 9 of the wheel. A suitable slot is provided in the cleat 3 for the purpose of controlling the lateral movement of the pawl lever 22.

The axle 7 of the ratchet wheel is of such a length as to extend through a hole 24 in the door 25 of the casing 1, so that a suitable hand or indicator 26 can be secured thereto, so as to be actuated thereby.

27 is a suitable indicating arrangement used in connection with the hand 26 for indicating the number of games played.

The method of operating the device is as follows: The checker puts a triangle on the hook 20 at the termination of each game, and thereby causes the lever 18 to assume its lowest position, and at the same time, make the tooth 23 of the lever 22 pull downwardly on the wheel 8. This action in turn will cause the indicator hand to move up one notch or point, and at the same time a tension will be put on the spring 11 that will cause the wheel 8 to return to its normal position on the removal of the means that keeps said wheel in the position that the same has been moved up to. As the wheel is rotated by means of the pawl lever 22, it will ride past the tooth 13 of the pawl lever 12 in the ordinary ratchet manner, but will be prevented from rotating downwardly by said tooth, as the same will be kept in engagement with the tooth of the wheel 8 by means of the spring 14. When the games are paid for, the operator or checker places a key in the slot 17, which is in the door of the casing, and when the blade of the key is brought into proper registry with the lever 15, it is turned so as to disengage the tooth 13 from the wheel and permit the same to rotate back to its normal position, provided that the triangle is not on the lever 18.

While there is shown a spring for the purpose of providing the necessary tension on the wheel, it is of course understood that a weight can be used for the purpose, and is in many cases preferable, so that it is not desired to limit this application for patent to the particular form of construction shown in the drawings, or in any other way otherwise than necessitated by the prior art, as many modifications in the construction may be made without departing from the principles thereof and coming within the scope of the appended claim.

Having thus described this invention, what is claimed is:—

A pool register, including a casing, cleats mounted in said casing and arranged one above the other, another cleat secured to the first named cleats and extending transversely thereof, a ratchet wheel mounted between said last named cleat and the adjoining face of the casing and also between the first named cleats, a spool movable with said ratchet wheel and disposed between the ratchet wheel and the said transversely extending cleat, a cord connected to said spool to wind thereon, a spring connected to the cord and secured within the casing, a spring pressed detent confined between the cleats and the adjoining face of the casing and adapted to engage the ratchet wheel, a pawl mounted between one of said cleats and the adjoining face of the casing and also adapted to engage the ratchet wheel, an actuating lever connected to said pawl and fulcrumed in the casing, means connected to the detent for retracting the latter, and an indicating pointer movable with said ratchet wheel, for the purpose specified.

In testimony whereof I hereunto affix my signature in the presence of two witnesses.

ERNEST F. MANCHESTER.

Witnesses:
B. F. BOWMAN,
J. C. SHERBURNE.